United States Patent

[11] 3,588,436

| | | | | |
|---|---|---|---|---|
| [72] | Inventor | Hans Hoscheler Munich, Germany | | |
| [21] | Appl. No. | 867,291 | | |
| [22] | Filed | Oct. 17, 1969 | | |
| [45] | Patented | June 28, 1971 | | |
| [73] | Assignee | Siemens Aktiengesellschaft Berlin, Germany | | |
| [32] | Priority | Oct. 19, 1968 | | |
| [33] | | Germany | | |
| [31] | | P 18 04 106.0 | | |

[54] CIRCUIT ARRANGEMENT FOR MONITORING THE WELDING CURRENT OF WELDING APPARATUS
5 Claims, 4 Drawing Figs.

[52] U.S. Cl. ............................................. 219/109
[51] Int. Cl. ............................................. B23k 11/24
[50] Field of Search ............................................. 219/108—114, 121

[56] References Cited
UNITED STATES PATENTS
3,340,461  9/1967  Archer ........................ 279/11

Primary Examiner—J. V. Truhe
Assistant Examiner—J. G. Smith
Attorneys—Curt M. Avery, Arthur E. Wilfond, Herbert L. Lerner and Daniel J. Tick ABSTRACT: The primary winding of a transformer is connected in parallel with the primary winding of a welding transformer. A pulse generator is connected to the secondary winding of the transformer via a rectifier. The pulse generator produces a pulse of constant amplitude for such length of time as the voltage supplied to it by the rectifier exceeds a response level. An integrator amplifier is connected to the pulse generator and is switched back to its initial condition upon the completion of a supply of welding current to the welding apparatus. An indicator connected to the integrator amplifier indicates when the voltage produced by such amplifier exceeds the response level.

CIRCUIT ARRANGEMENT FOR MONITORING THE WELDING CURRENT OF WELDING APPARATUS

DESCRIPTION OF THE INVENTION

The invention relates to a circuit arrangement for monitoring the welding current of welding apparatus. More particularly, the invention relates to a circuit arrangement for monitoring the welding current of automatic resistance welding apparatus.

In industrial mass production such as, for example, of automobile bodies, sheet iron parts are welded by a point welding process which is a special type of resistance welding. To accomplish this, automatic welding apparatus is utilized which executes working steps or stages controlled by a predetermined program. The working steps basically involve mechanically pressing the parts to be welded together prior to the welding operation, the actual welding process in which welding current is supplied to the welding electrodes, pressing the welded parts together after the welding operation and until mechanical stability is provided, and removing the welding electrodes from the workpiece. This type of automatic welding apparatus includes a current supply and a control device known as a welding timer. The welding timer controls the duration of the working steps or stages and the intensity of the welding current.

The welding apparatus also includes a welding transformer connected to a source of alternating voltage via an electronic switch or switches. The electronic switches may comprise any suitable electronic switches such as, for example, thyratrons, thyristors, or the like, which are synchronously controlled by the alternating voltage provided by the alternating voltage source. The intensity of the welding current is generally varied due to the time that the thyristors or thyratrons are in their conductive condition. Such intensity is varied relative to the zero passage of the alternating voltage. This involves phase angle control. The firing angle, and thereby the effective value of the current, depends upon the characteristics of the sheet iron parts to be welded.

Since the quality of the finished product depends upon the quality of each individual welding point or weld, each such welding point must be examined with respect to quality. This may be accomplished superficially, for example, by examining the color of each welding point. It is possible, however, that a welding point may fail altogether, due to disturbances in the welding apparatus or in the welding timer. This type of failure may sometimes be undetected during control, since the welding points are generally not uniformly distributed across the area to be welded.

It would be possible to control the welding process or operation by measuring the welding current and evaluating it in order to determine whether a specific minimum current has been flowing for a specific time. However, a current transformer is required to measure the welding current. The current transformer must be tuned or adjusted to the welding current. This type of monitoring arrangement must be universally adaptable. It is therefore necessary that it be possible to switch over the current transformer, since when there is no switchover; the monitoring arrangement will function erroneously. Furthermore, a current transformer is relatively expensive.

In a known arrangement for monitoring the welding process, the welding voltage is controlled, rather than the welding current. A transformer is utilized having a primary winding connected in parallel with the primary winding of the welding transformer. The voltage produced by the secondary winding of the transformer is proportional to the welding voltage and is rectified in a rectifier. The rectified voltage is applied to the first input of an AND gate. Test pulses are applied to the second input of the AND gate during each half wave of the alternating voltage. The test pulses have a phase displacement relative to the preceding zero passage of the alternating voltage which is greater than the largest feasible firing angle. Thus, independently of the phase displacement angle, a signal is always provided at the output of the AND gate when a current has actually passed within a half wave. The aforedescribed monitoring arrangement, however, is incapable of determining whether a specific minimum amount of current has passed.

The principal object of the invention is to provide a new and improved circuit arrangement for monitoring the welding current of welding apparatus.

An object of the invention is to provide a circuit arrangement for monitoring the welding current of welding apparatus without the utilization of a current transformer.

An object of the invention is to provide a circuit arrangement for monitoring the minimum current flow in welding apparatus without utilizing a current transformer.

An object of the invention is to provide a circuit arrangement for monitoring the welding current of welding apparatus with efficiency, effectiveness and reliability.

The basic principle of my invention is to replace the control of the current by a control of the current by a control of the voltage which derives the current.

In accordance with the invention, a circuit arrangement monitors the welding current of automatic welding apparatus which performs a plurality of working steps and includes a control device, an electronic switch controlled in phase angle and synchronized with an alternating voltage from an alternating voltage source, and a welding transformer connected to the alternating voltage source for an adjustable number of periods via the switch, the welding transformer having a primary winding connected via the switch to the alternating voltage source. The circuit arrangement comprises a transformer having a primary winding connected in parallel with the primary winding of the welding transformer and a secondary winding. A rectifier has an output and an input connected to the secondary winding of the transformer. A pulse generator has an output and an input connected to the output of the rectifier for producing a pulse of constant amplitude for such length of time as the voltage supplied to it by the rectifier exceeds a response level. An integrator amplifier has an output and an input coupled to the output of the pulse generator. An amplifier control connected to the integrator amplifier switches the integrator amplifier back to its initial condition upon the completion of a supply of welding current to the welding apparatus. An indicator has an input connected to the output of the integrator amplifier for indicating when the voltage produced by the integrator amplifier exceeds the response level.

The integrator amplifier comprises an amplifier having a feedback circuit connected between the output and input thereof and a feedback capacitor connected in the feedback circuit. The amplifier control comprises means for discharging the feedback capacitor at an adjustable substantially constant current.

The indicator comprises a critical value indicator having an adjustable critical value.

An AND gate has a first input connected to the output of the pulse generator, a second input and an output coupled to the input of the integrator amplifier. Control means is connected to the second input of the AND gate and supplies a control signal when a welding step is initiated by the welding apparatus.

In order that my invention may be readily carried into effect, it will now be described with reference to the accompanying drawings, wherein.

Figure 1:
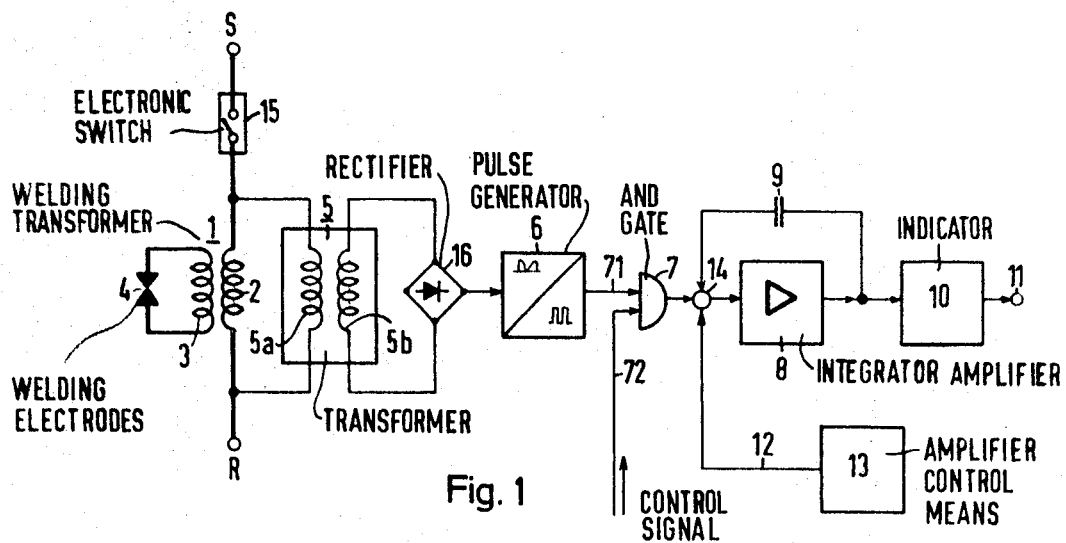
FIG. 1 is a block diagram of an embodiment of the circuit arrangement of the invention.

In FIG. 1, the welding apparatus includes a welding transformer 1. The welding transformer 1 has a primary winding 2 connected to a source of AC voltage having terminals S and R. The primary winding 2 of the welding transformer 1 is connected to the alternating voltage source via an electronic switch 15. The electronic switch 15 may comprise any suitable electronic switch such as, for example, a thyristor, a thyratron, or the like, or a plurality of such switches. If a plurality of such switches is utilized, they are connected in antiparallel relation with each other. The welding transformer 1 has a secondary winding 3 which is connected to welding electrodes 4 of the welding apparatus.

The circuit arrangement of the invention, as shown in FIG. 1, comprises a transformer 5 having a primary winding 5a connected in parallel with the primary winding 2 of the welding transformer 1. The transformer 5 provides the voltage drop of the primary winding 2 of the welding transformer 1. The transformer 5 has a secondary winding 5b which is connected, via a rectifier bridge 16, to the input of a pulse generator 6. The pulse generator 6 may comprise any suitable pulse generator such as, for example, a schmitt trigger. The pulse generator 6 is illustrated as a single-pole unit in the interest of clarity of illustration and simplicity.

The output of the pulse generator 6 is connected to the first input 71 of an AND gate 7. The output of the AND gate 7 is coupled to the input of an integrator amplifier 8 via a circuit point 14. A negative feedback circuit, which includes a feedback capacitor 9, is connected between the output of the integrator amplifier 8 and its input, as indicated by the circuit point 14. The output of the integrator amplifier 8 is connected to the input of a critical value indicator 10, An output terminal 11 is connected to the output of the indicator 10.

Figure 2:
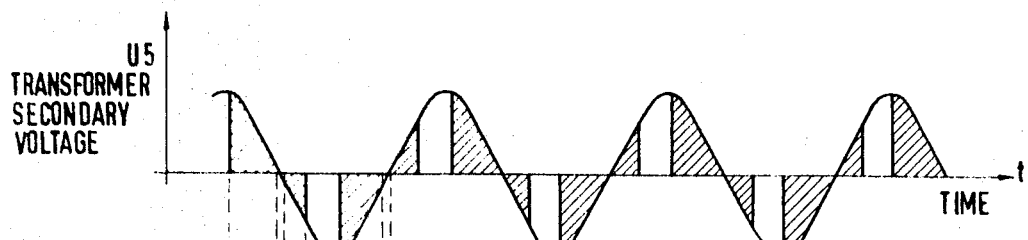
FIg. 2 is a graphical presentation of the voltage of the secondary winding of the transformer of the circuit arrangement of FIG. 1.
Figure 3:
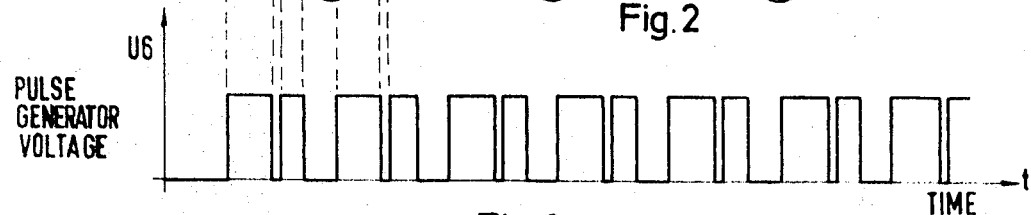
FIG. 3 is a graphical presentation of the output voltage of the pulse generator of the circuit arrangement of FIG. 1.
Figure 4:
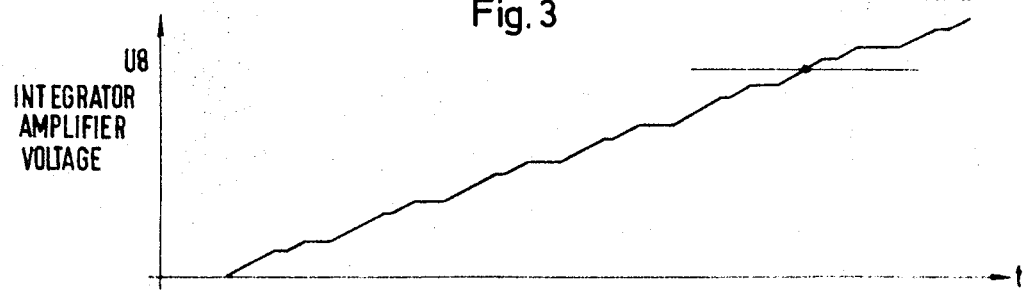
FIG. 4 is a graphical presentation of the output voltage of the integrator amplifier of the circuit arrangement of FIG. 1.

The circuit arrangement of FIG. 1 operates in a manner indicated by the curves of FIGS. 2, 3 and 4. In each of FIGS. 2, 3 and 4, the abscissa represents the time $t$. In FIG. 2, the ordinate represents the secondary voltage of the transformer 5. In FIG. 3, the ordinate represents the output voltage of the pulse generator 6. In FIG. 4, the ordinate represents the output voltage of the integrator amplifier 8.

It is assumed that the switch 15 is controlled by a welding timer of the welding apparatus, not shown in the FIGS., so that voltage-time areas are produced at the secondary winding of the transformer 5, as shown by the hatching in FIG. 2. The voltage-time areas are applied to the pulse generator 6 via the rectifier 16. The pulse generator 6 converts the unipolar voltage applied to its input into a pulse sequence of constant amplitude. The output voltage pulse sequence produced by the pulse generator 6 is shown in FIG. 3.

The output pulses produced by the pulse generator 6 are applied to the first input 71 of the AND gate 7 and are applied to the input of the integrator amplifier 8, via said AND gate, when said AND gate is in its conductive condition. The AND gate 7 is switched to its conductive condition by a control signal, supplied by the welding timer, which indicates that the welding step is initiated by the welding apparatus, or that welding current is supplied to the welding electrodes 4 in the welding apparatus.

The feedback capacitor 9 provides the integrator amplifier 8 with the characteristics of an integrator amplifier, so that said integrator amplifier integrates the pulse sequence applied to its input from the pulse generator 6 via the AND gate 7. The output voltage of the integrator amplifier 8 is shown in FIG. 4. The output voltage of the integrator amplifier 8, as shown in FIG. 4, increases in magnitude for the period of time that pulses are supplied to its input. After a specific number of pulses have been supplied to the input of the integrator amplifier 8, the output voltage of said integrator amplifier is increased to the point that the indicator 10 responds and produces a signal at the output terminal 11. The indicator 10 thus produces an output signal when the integrator amplifier 8 exceeds a response level. This constitutes the criterion for the fact that the welding voltage has been applied to the welding transformer for a specific period of time. In such case, a specific minimum magnitude of current has passed, provided that the secondary circuit of the welding transformer 1 has been closed.

In order that the minimum magnitude of current suffices for a perfect welding operation, said current must be adjusted to the intensity of the material to be welded. This is accomplished either by adjustment of the time magnitude of the lead angle or by adjustment of the number of periods of the alternating welding voltage, or by adjustment of both magnitudes. Accordingly, the time during which a signal is to occur at the output terminal 11, as a criterion for a perfect welding process, must be adjusted to the material to be welded. When these prerequisites are satisfied, the signal provided at the output terminal 11 may be utilized as the release signal for the next step or stage in the working process.

The threshold indicator 10 may be so designed that its critical value, limit, level, threshold, or the like, is adjustable. The integrator amplifier may be designed in a manner whereby the steepness or inclination of the voltage rise may be at its output. To accomplish this, the feedback capacitor 9 is connected to the output of the amplifier control means 13 via the circuit point 14 and a lead 12 from said circuit point to said amplifier control means. The amplifier control means 13 discharges the feedback capacitor 9 with an adjustable, fundamentally constant, current. When the discharge current is high, or even zero, the voltage rise at the output is small or zero. After terminating the welding current step of the operation, the integrator amplifier 8 is provided with a signal which resets it to its initial condition.

The welding apparatus may be monitored by the circuit arrangement of my invention, in order to determine whether or not sufficient welding current has passed within a specified period. The welding current may fail for many reasons. Thus, the welding voltage may fail, or the switches 15, which control the welding voltage, may fail. Furthermore, there may be an operational error which results in the adjustment of too small a lead angle, or too few periods.

There may be a defect in the switch of the welding electrodes, even during the switching working step. During the making of the contact, a light arc occurs between the workpiece and the electrode. There is then no provision of the next step in the working process, since there is no coincidence of the two inputs to the AND gate 7, as required.

While the invention has been described by means of a specific example and in a specific embodiment, I do not wish to be limited thereto, for obvious modifications will occur to those skilled in the art without departing from the spirit and scope of the invention.

I claim:

1. A circuit arrangement for monitoring the welding current of automatic welding apparatus which performs a plurality of working steps and includes a control device, an electronic switch controlled in phase angle and synchronized with an alternating voltage from an alternating voltage source, and a welding transformer connected to said alternating voltage source for an adjustable number of periods via said switch, the welding transformer having a primary winding connected via said switch to said alternating voltage source, said circuit arrangement comprising:

a transformer having a primary winding connected in parallel with the primary winding of said welding transformer and a secondary winding;

rectifier means having an input connected to the secondary winding of said transformer;

pulse-generating means having an input connected to the output of said rectifier means for producing a pulse of constant amplitude for such length of time as the voltage supplied to it by said rectifier means exceeds a response level;

integrator amplifier means having an input coupled to the output of said pulse generator means;

amplifier control means connected to said integrator amplifier means for switching said integrator amplifier means back to its initial condition upon the completion of a supply of welding current to said welding apparatus; and indicating means having an input connected to the output of said integrator amplifier means for indicating when the voltage produced by said integrator amplifier means exceeds said response level.

2. A circuit arrangement as claimed in claim 1, wherein said integrator amplifier means comprises an amplifier having a feedback circuit connected between the output and input thereof and a feedback capacitor connected in said feedback circuit, and said amplifier control means comprises means for discharging said feedback capacitor at an adjustable substantially constant current.

3. A circuit arrangement as claimed in claim 1, wherein said indicating means comprises a critical value indicator having an adjustable critical value.

4. A circuit arrangement as claimed in claim 1, further comprising an AND gate having a first input connected to the output of said pulse generator means, a second input and an output coupled to the input of said integrator amplifier means and control means connected to the second input of said AND gate for supplying a control signal when a welding step is initiated by said welding apparatus.

5. A circuit arrangement as claimed in claim 4, wherein said integrator amplifier means comprises an amplifier having a feedback circuit connected between the output and input thereof and a feedback capacitor connected in said feedback circuit, said amplifier control means comprises means for discharging said feedback capacitor at an adjustable substantially constant current, and said indicating means comprises a critical value indicator having an adjustable critical value.